United States Patent
Smith et al.

(10) Patent No.: US 12,479,602 B1
(45) Date of Patent: Nov. 25, 2025

(54) SPACECRAFT FORMATION CONTROL FOR FIXED THRUST PROPULSION

(71) Applicant: Utah State University Space Dynamics Laboratory, North Logan, UT (US)

(72) Inventors: Tyson Smith, North Logan, UT (US); John Akagi, North Logan, UT (US)

( * ) Notice: Subject to any disclaimer, the term of this patent is extended or adjusted under 35 U.S.C. 154(b) by 71 days.

(21) Appl. No.: 18/611,850

(22) Filed: Mar. 21, 2024

(51) Int. Cl.
*B64G 1/24* (2006.01)
*B64G 1/10* (2006.01)
*G06F 30/20* (2020.01)

(52) U.S. Cl.
CPC .......... *B64G 1/244* (2019.05); *B64G 1/1085* (2013.01); *G06F 30/20* (2020.01)

(58) Field of Classification Search
CPC ........ B64G 1/244; B64G 1/1085; G06F 30/20
See application file for complete search history.

(56) References Cited

U.S. PATENT DOCUMENTS

| | | | |
|---|---|---|---|
| 11,091,280 B1* | 8/2021 | Conn | B64G 1/1085 |
| 2021/0053574 A1* | 2/2021 | Bielby | B60R 16/0232 |
| 2022/0097873 A1* | 3/2022 | Cheng | B64G 1/10 |
| 2022/0272540 A1* | 8/2022 | Hayes | H04W 12/128 |
| 2023/0409054 A1* | 12/2023 | Bradley | G05D 1/106 |
| 2024/0080673 A1* | 3/2024 | Newman | H04W 24/10 |
| 2024/0134995 A1* | 4/2024 | Madala | G06F 21/577 |
| 2024/0345589 A1* | 10/2024 | Yasuyama | G06Q 50/40 |

\* cited by examiner

*Primary Examiner* — Hussein Elchanti

(57) ABSTRACT

For spacecraft control, a method iteratively measures a drifting spacecraft trajectory of a spacecraft relative to a bounding box, wherein the spacecraft has a fixed maximum thrust, a minimum thrust duration, a thrust duration that is an integer multiple of the minimum thrust duration, and a fixed update period. In response to the determining the spacecraft does not satisfy a trajectory condition, the method iteratively calculates maneuver controls wherein there are a number of guidance trajectories within the thruster duration. The method maneuvers the spacecraft along the guidance trajectories with the maneuver controls.

20 Claims, 17 Drawing Sheets

221

| Semi-Major Axis 901 |
| Eccentricity 903 |
| Inclination 905 |
| Argument of Perigee 907 |
| Right Ascension of Ascending Node 909 |
| Mean Anomaly 911 |
| Mean Argument of Latitude 913 |
| x Axis Eccentricity 915 |
| y Axis Eccentricity 917 |

| Fixed Maximum Thrust 271 |
|---|
| Minimum Thrust Duration 273 |
| Thruster Duration 275 |
| Guidance Trajectories 119 |
| Fixed Update Period 279 |
| Trajectory Condition 281 |
| Maneuver Controls 283 |
| Control Inputs 285 |
| Control Usage Weight 287 |
| Transient State Error 289 |
| Final State Error 291 |
| Trajectory Error 293 |
| Velocity Change 295 |
| Minimum Duration Period Number 297 |
| Trajectory Velocity 299 |

FIG. 2C

SPACECRAFT FORMATION CONTROL FOR FIXED THRUST PROPULSION

BACKGROUND INFORMATION

The subject matter disclosed herein relates to spacecraft formation control for fixed thrust propulsion.

BRIEF DESCRIPTION

A method for spacecraft control is presented. The method iteratively measures a drifting spacecraft trajectory of a spacecraft relative to a bounding box. The spacecraft has a fixed maximum thrust, a minimum thrust duration, a thruster duration that is an integer multiple of the minimum thrust duration, and a fixed update period. In response to the determining the spacecraft does not satisfy a trajectory condition, the method iteratively calculates maneuver controls wherein there are a number of guidance trajectories within the thrust duration. The method maneuvers the spacecraft along at least one guidance trajectory with the maneuver controls. An apparatus and computer program product that performs the method is also presented.

BRIEF DESCRIPTION OF DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B is a schematic block diagram illustrating one embodiment of orbital data;

FIG. 2C is a schematic block diagram illustrating one embodiment of maneuvering data;

DETAILED DESCRIPTION

Figure 1A:
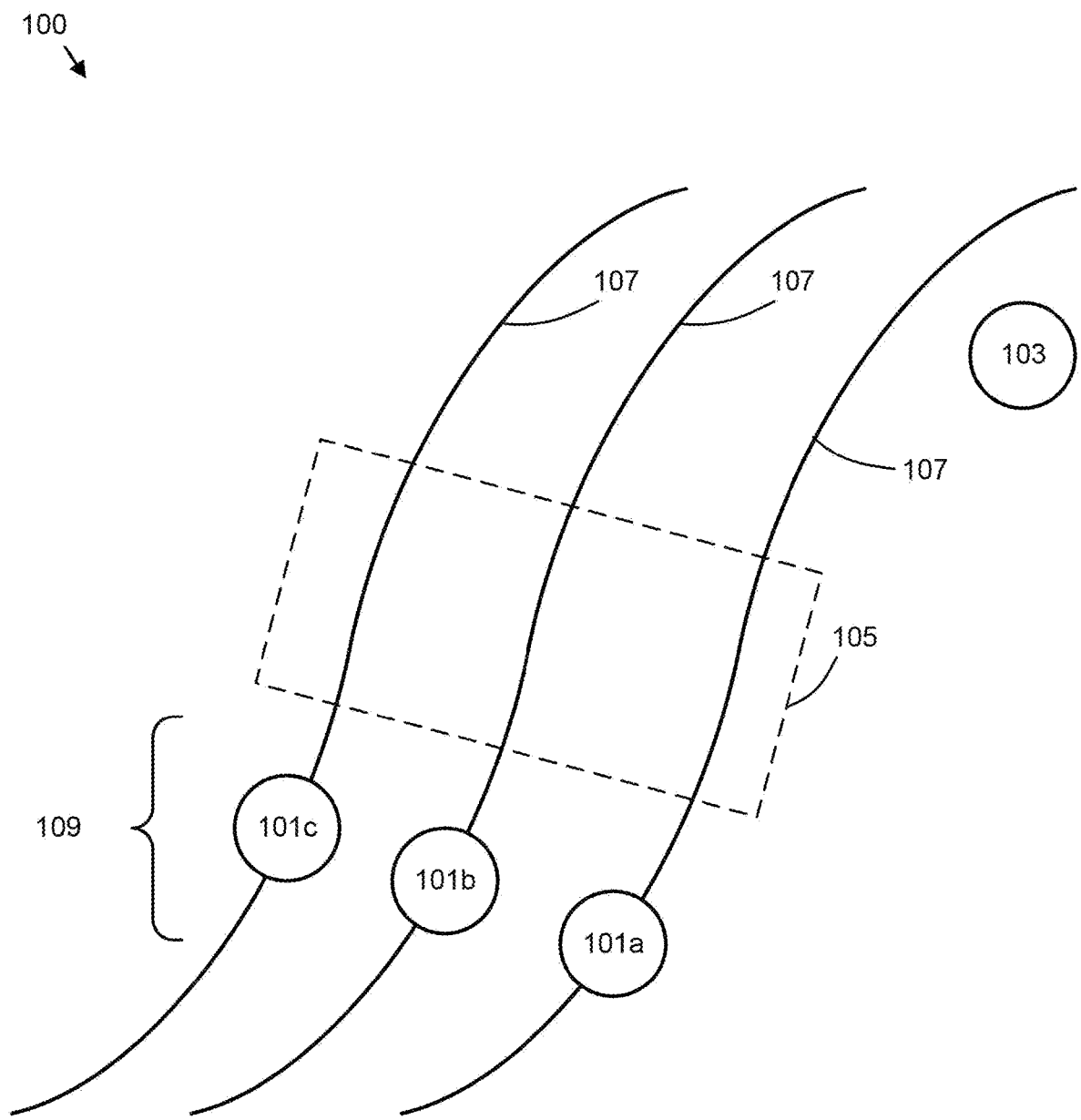
FIG. 1A is a schematic diagram illustrating one embodiment of a spacecraft constellation.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

Program code for carrying out operations for aspects of the present invention may be written in any combination of one or more programming languages, including an object-oriented programming language such as MATLAB, Python, Ruby, R, Java, Java Script, *Julia*, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1A is a schematic diagram illustrating one embodiment of a spacecraft constellation 100. In the depicted embodiment, a plurality of spacecraft 101 are shown traversing orbital tracks 107. The spacecraft 101 may be orbiting in a spacecraft formation 109 to perform a mission objective such as capturing data in a target area 105. Capturing data may include but is not limited to gravitational mapping, capturing images, capturing sensor data, making measurements, communicating with ground stations 103 on the ground, communicating with another spacecraft 101, and the like.

A spacecraft 101 may need to maneuver to remain in the spacecraft formation 109. For example, a mission may require the spacecraft 101 to maintain a specified separation distance. In addition, the spacecraft 101 may maneuver to avoid debris or perform a mission objective. Maneuvers are complicated by a need to maintain the spacecraft formation 109 and/or separations distances. In addition, maneuvers are constrained by a need to reduce fuel consumption. Unfortunately, both communication bandwidth to the spacecraft 101 and/or on spacecraft computing resources may be limited. As a result, the spacecraft 101 may need to calculate maneuvers with restricted computing resources. In addition, a ground station 103 may need to calculate maneuvers for many spacecraft 101 concurrently.

The embodiments described herein determine and maintain guidance trajectories for a spacecraft formation 109. The embodiments may simplify the calculations so that a spacecraft 101 may perform the calculations autonomously. In addition, the embodiments may speed the calculations for maneuvers at the ground station 103. As a result, the efficiency of a computer controlling the spacecraft 101 is improved.

Figure 1B:
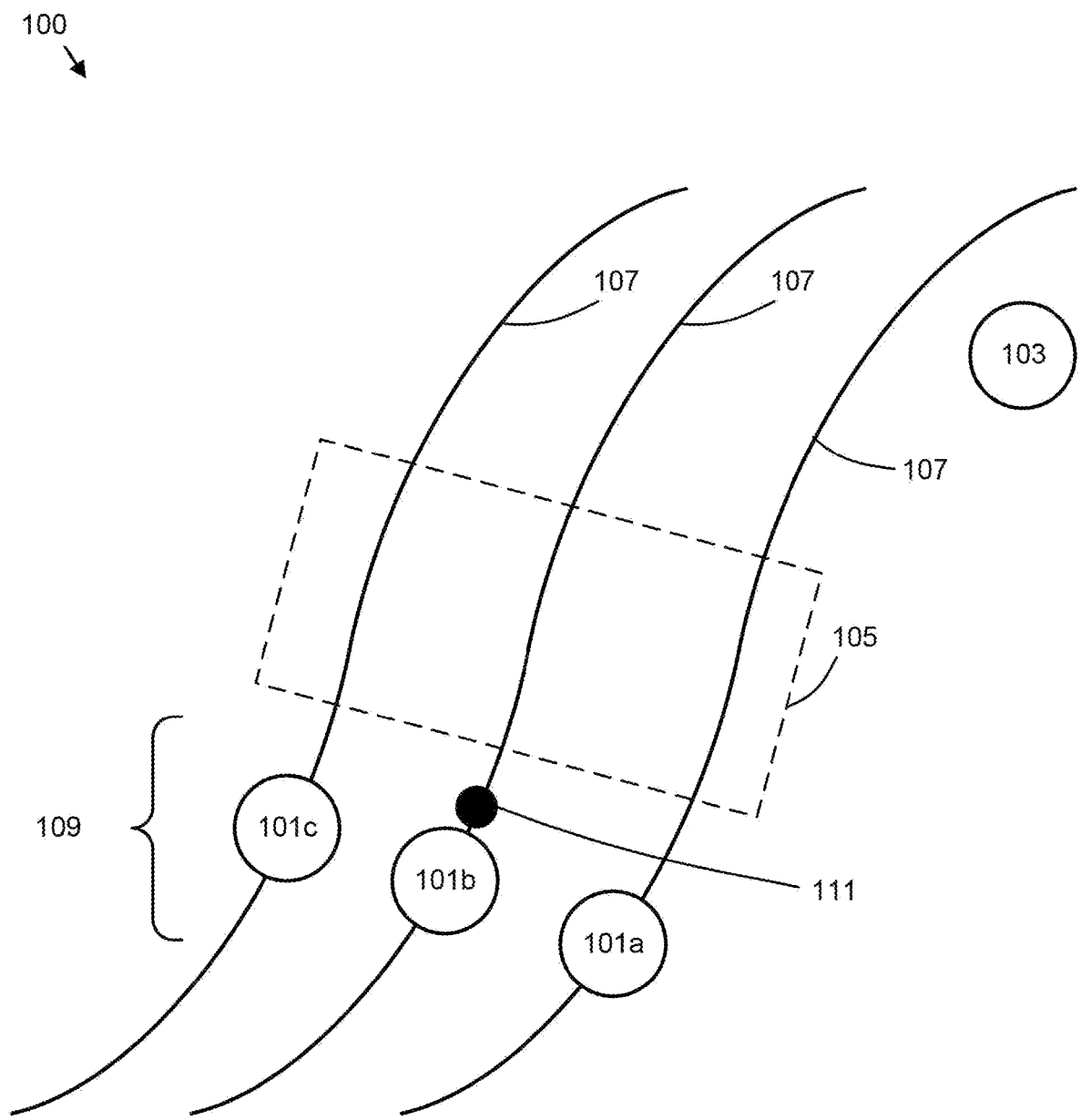
FIG. 1B is a schematic diagram illustrating one alternate embodiment of a spacecraft constellation.

FIG. 1B is a schematic diagram illustrating one alternate embodiment of the spacecraft constellation 100. In the depicted embodiment, a virtual point 111 is shown for the spacecraft formation 109. The virtual point 111 may be used to calculate a reference orbit for each spacecraft 101 in the spacecraft formation 109. There may be no physical spacecraft 101 associated with the virtual point 111. The virtual point 109 represents a fictitious spacecraft 101 where motion is propagated through time according to a standard nonlinear motion model. From the virtual point 111, relative orbital tracks 107 may be generated that define the nominal locations of each of the spacecraft 101 within the spacecraft formation 109. The virtual point 111 may represent the spacecraft formation 109 to each spacecraft 101, simplifying control calculations. In the depicted embodiment, the virtual point 111 leads the spacecraft formation 109.

Figure 1C:
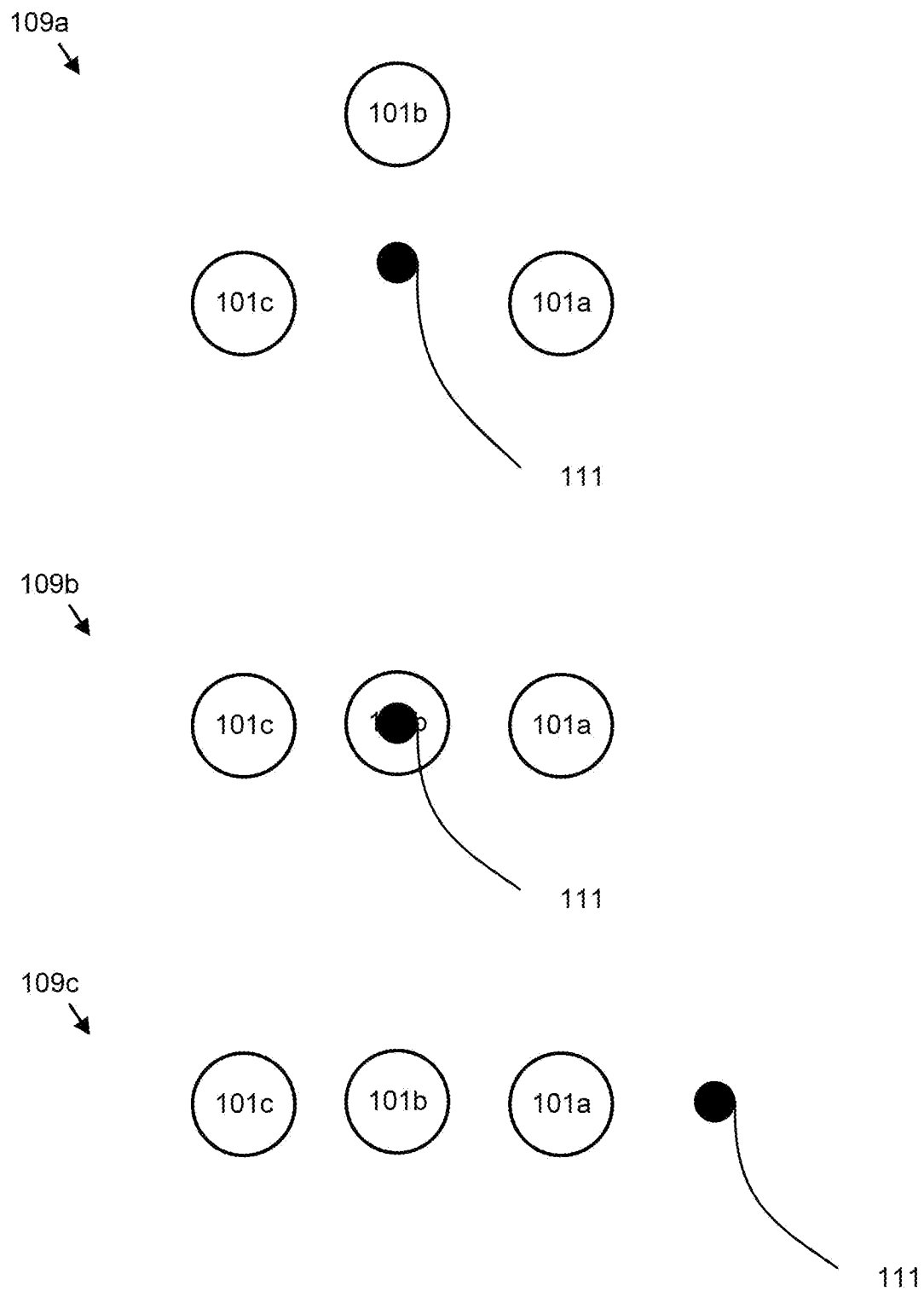
FIG. 1C is a schematic diagram illustrating one embodiment of virtual points.

FIG. 1C is a schematic diagram illustrating one embodiment of virtual points 111 in spacecraft formations 109*a-c*. The virtual point 111 may be at a center of a spacecraft formation 109 as shown for spacecraft formations 109*a/b*. The virtual point 111 may be collocated with a spacecraft 101. The virtual point 111 may be offset from the center including outside the spacecraft formation 109 as shown in spacecraft formation 109*c*.

Figure 1D:
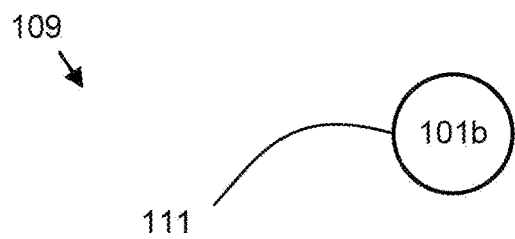
FIG. 1D is a schematic diagram illustrating one embodiment of a drifting spacecraft trajectory.
Figure 1D:
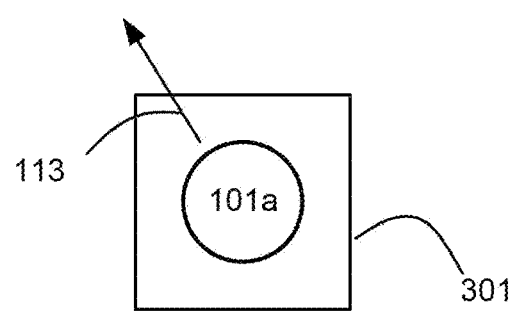

FIG. 1D is a schematic diagram illustrating one embodiment of a drifting spacecraft trajectory 113. The spacecraft 101 drifts in orbit with the drifting spacecraft trajectory 113. The drifting spacecraft trajectory 113 may be ROE. The spacecraft 101 may drift relative to the virtual point 111. In the depicted embodiment, the virtual point 111 is another spacecraft 101.

In the depicted embodiment, the drifting spacecraft trajectory 113 carries or will carry the spacecraft 101 outside of a bounding box 301. Exiting the bounding box 301 may satisfy a trajectory condition. In addition, exiting the bounding box 301 in the future may satisfy the trajectory condition. The trajectory condition 281 may be a drifting spacecraft trajectory 113 relative to the bounding box 301 that is less than a minimum trajectory error.

The embodiments may iteratively calculate maneuver controls for the spacecraft 101 in response to exiting the boundary box 301 or predicting the spacecraft 101 will exit the bounding box 301. However, if the spacecraft 101 is not predicted to exit the bounding box 301, the embodiments will not calculate maneuver controls.

Figure 1E:
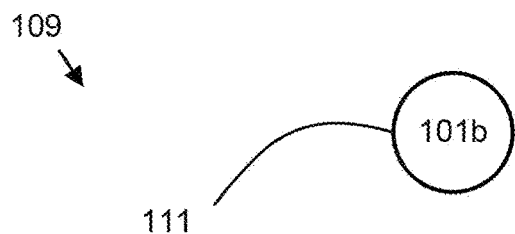
FIG. 1E is a schematic diagram illustrating one embodiment of maneuvering a spacecraft.
Figure 1E:
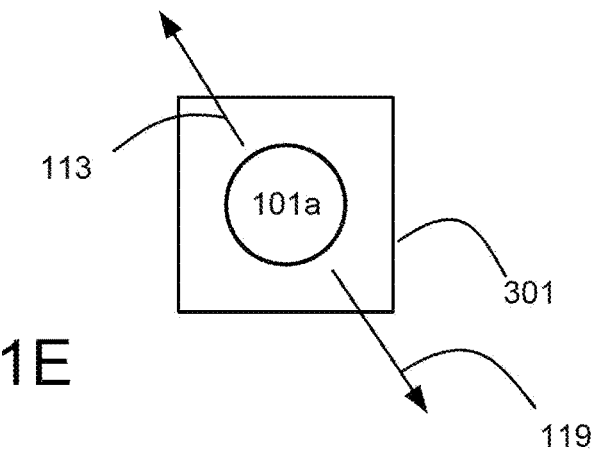

FIG. 1E is a schematic diagram illustrating one embodiment of maneuvering a spacecraft 101. In the depicted embodiment, the spacecraft 101 maneuvers along a guidance trajectory 119 in response to satisfying a trajectory condition 281. The guidance trajectory 119 may keep the spacecraft 101 within the bounding box 301.

Figure 2A:
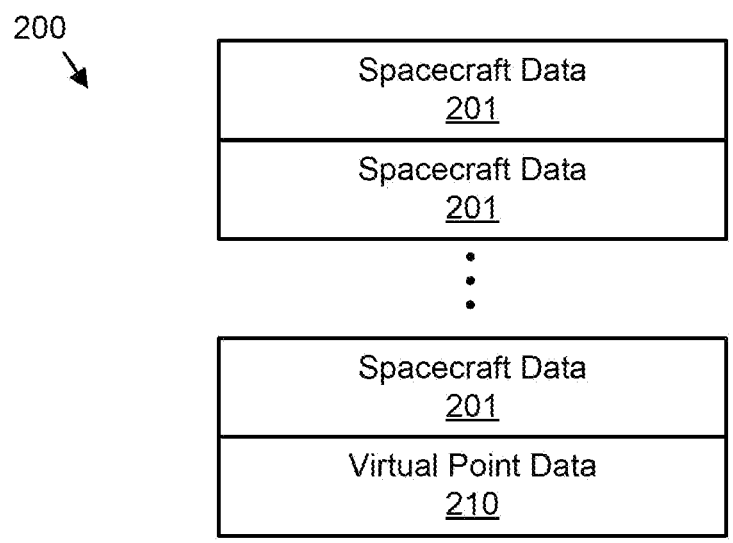
FIG. 2A is a schematic block diagram illustrating one embodiment of formation data.

FIG. 2A is a schematic block diagram illustrating one embodiment of formation data 200. The formation data 200 describes the orbital track 107 of the spacecraft 101 in the spacecraft formation 109. The formation data 200 may be organized as a data structure in a memory. The formation data 200 includes spacecraft data 201 for each spacecraft 101 in the spacecraft formation 109. The spacecraft data 201 may include orbital data and maneuvering data as described in FIGS. 2B and 2C. In addition, the formation data 200 includes virtual data 210 that describes the orbital track 107 of the virtual point 111.

FIG. 2B is a schematic block diagram illustrating one embodiment of the orbital data 221. The orbital data 221 may be expressed as ROE. In one embodiment, the orbital data 221 is based on D'Amico ROE coordinates. In addition, the orbital data 221 may employ Hill-Clohessy-Wiltshire (HCW) equations.

In the depicted embodiment, the orbital data 221 includes a semi-major axis 901, an eccentricity 903, an inclination 905, an argument of perigee 907, a right ascension of ascending node 909, a mean anomaly 911, a mean argument of latitude 913, an x axis eccentricity 915, and a y axis eccentricity 917.

FIG. 2C is a schematic block diagram illustrating one embodiment of the maneuvering data 222. In the depicted embodiment, the maneuvering data 222 includes a fixed maximum thrust 271, a minimum thrust duration 273, a thruster duration 275, guidance trajectories 119, a fixed update period 279, a trajectory condition 281, a maneuver controls 283, control inputs 285, a control usage weight 287, a transient state error 289, a final state error 291, a trajectory error 293, a minimum duration period number 297, and a trajectory velocity 299.

One embodiment of a standard set of Keplerian orbital elements include the semi-major axis a 901, the eccentricity e 903, the inclination i 905, the argument of perigee ω 907, the right ascension of ascending node Ω 909, and the mean anomaly M 911. The dimensionless ROEs are defined as shown in Eq. 1, with the mean argument of latitude f 913 f=ω+M, the x axis eccentricity $e_x$ $e_x$=ecosω, a y axis eccentricity $e_y$ $e_y$=esin ω and the c and d subscripts indicating if the state belongs to the virtual point 111 or spacecraft 101, respectively. The δα term represents the relative difference in semi-major axis 901 and δλ term gives the relative mean longitude between two spacecraft 101 and/or a spacecraft 101 and a virtual point 111. The $\delta e_x$ 915 and $\delta e_y$ 917 can be composed into a single δe relative eccentricity vector where the magnitude gives the orbit size along the radial direction. Similarly, the change in x inclination $\delta i_x$ term 919 and the change in y inclination $\delta i_y$ term 921 may create the Si relative inclination vector where the magnitude defines the size of the orbit along the normal axis. This relative state representation may be nonsingular for circular orbits ($e_c$=0), whereas it is singular for strictly equatorial orbits ($i_c$=0).

$$x = \begin{bmatrix} \delta a \\ \delta \lambda \\ \delta e_x \\ \delta e_y \\ \delta i_x \\ \delta i_y \end{bmatrix} = \begin{bmatrix} (a_d - a_c)/a_c \\ (f_d - f_c) + (\Omega_d - \Omega)\cos i_c \\ e_{x,d} - e_{x,c} \\ e_{y,d} - e_{y,c} \\ i_d - i_c \\ (\Omega_d - \Omega_c)\sin i_c \end{bmatrix} \quad (1)$$

The mean argument of latitude f 913 for each spacecraft 101 changes as a function of M over the course of each orbit. Given μ as the standard gravitational parameter, this change is calculated using Eq. 2.

$$\dot{f} = \frac{df}{dt} = \sqrt{\frac{\mu}{a^3}}. \quad (2)$$

Comparing mean argument of latitude f 913 between a virtual point 111 and spacecraft 101 gives a change in mean argument of latitude in Eq. 3 which is constant assuming the virtual point 111 and spacecraft 101 have the same semi-major axes 901.

$$\Delta f = f_d - f_c. \quad (3)$$

If the virtual point 111 and spacecraft 101 do not have the same semi-major axis 901, then the change in the mean argument of latitude Δf term can be approximated to the first order as Eq. 4 where n is the mean orbital motion.

$$\Delta \dot{f} = \frac{d(\Delta f)}{dt} = -\frac{3}{2}\sqrt{\frac{\mu}{a^5}}\Delta a = -\frac{3}{2}n\frac{\Delta a}{a} = -\frac{3}{2}n\delta a \quad (4)$$

Eq. 4 may assume that the change in semi-major axis Da is small compared to the inertial orbital radius of the virtual point 111.

Assuming two-body motion with no perturbations, the change in mean argument of latitude Δf, and consequently δλ, is the only ROE which is non-constant. Thus, the drifting ROE dynamics can be described as in Eq. 5, where A is a matrix.

$$\dot{x} = \begin{bmatrix} 0 & 0 & 0 & 0 & 0 & 0 \\ -\frac{3n}{2} & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \begin{bmatrix} \delta a \\ \delta \lambda \\ \delta e_x \\ \delta e_y \\ \delta i_x \\ \delta i_y \end{bmatrix} = Ax. \quad (5)$$

Assuming impulsive ΔV control inputs 285 along the radial, tangential, and normal axes ($\delta v_r$, $\delta v_t$, and $\delta v_n$), the instantaneous change in the states are given as in Eq. 6 and the control matrix of Eq. 7

$$\Delta \delta a = +\frac{2}{na}\delta v_t \quad (6)$$

$$\Delta \delta \lambda = -\frac{2}{na}\delta v_r$$

$$\Delta \delta e_x = \frac{\sin f_M}{na}\delta v_r + \frac{2\cos f_M}{na}\delta v_t$$

$$\Delta \delta e_y = -\frac{\cos f_M}{na}\delta v_r + \frac{2\sin f_M}{na}\delta v_t$$

$$\Delta \delta i_x = +\frac{\cos f_M}{na}\delta v_n$$

$$\Delta \delta i_y = +\frac{\sin f_M}{na}\delta v_n$$

$$B = \begin{bmatrix} 0 & \frac{2}{na} & 0 \\ -\frac{2}{na} & 0 & 0 \\ \frac{\sin f_M}{na} & \frac{2\cos f_M}{na} & 0 \\ -\frac{\cos f_M}{na} & \frac{2\sin f_M}{na} & 0 \\ 0 & 0 & \frac{\cos f_M}{na} \\ 0 & 0 & \frac{\sin f_M}{na} \end{bmatrix} \quad (7)$$

MPC is a control approach where an optimization problem is solved to determine the optimal control inputs over some finite time horizon. Once one or more of those controls has been applied to the system, the system states are measured and the optimization problem is solved again, beginning at the new state. The process continues to repeat the cycle of optimizing, applying controls, and measuring the updated states.

Assuming the use of the guidance trajectories 119 generated as 1-norm where norm is a current state, and some allowable sets $\mathcal{X}$ and $\mathcal{U}$ for the states and controls, respectively, the MPC optimization problem can be written as shown in Eq. 8, where x(0) is the initial state, R is the control usage weight 287, Q is the transient state error 289, P is the final error 291, and N is the horizon over which the problem is solved.

$$J = \sum_{k=1}^{N-1} \|Qx_k\|_1 + \sum_{k=0}^{N-1} \|Ru_k\|_1 + \|Px_N\|_1 \qquad (8)$$

$$x_0 = x(0)$$

$$x_i \in \mathcal{X}, k = 1, , N$$

$$u_i \in \mathcal{U}, k = 0, , N-1$$

MPC is able to incorporate constraints on allowable state errors or control inputs. This is in contrast to standard state feedback control where stability can be guaranteed but, depending on the current state, could require arbitrarily large control authority. The matrices in the MPC objective function can be used to intuitively tune the performance by adjusting the relative importance of minimizing state errors with minimizing control usage. The MPC time horizon can be relatively short which allows for real-time computation while still guaranteeing long-term stability of the system.

In one embodiment, a spacecraft 101 is unable to always be maneuvering due to thruster constraints or mission requirements. This leads naturally to switched or hybrid systems where the spacecraft 101 begins maneuvering in response to a trajectory condition being met. Overall, it was found that using ROE states as the switching condition was more natural than using Cartesian positions and velocities since a single ROE vector defines the entire relative orbit.

In one embodiment, the spacecraft 101 drifts until the spacecraft 101 crosses, or is anticipated to cross, the bounding box 301. At this point, the spacecraft 101 begins maneuvering back to the nominal desired trajectory until the switch-off condition is met. Depending on the approach, the switch-off condition is either based on reaching some error threshold or on completion of some planned maneuver. Regardless, this pattern of maneuvering and drifting phases allows for dedicated periods of time when the spacecraft is free to accomplish its mission.

The embodiments employ a guidance and control algorithm where an MPC is used in conjunction with a guidance trajectory 119 to keep the at least one spacecraft 101 within an assigned orbit. In a certain embodiment, the spacecraft thrusters are only capable of producing a fixed amount of thrust such as the fixed maximum thrust 271.

In general, spacecraft thrusters have little to no ability to modulate the amount of thrust they produce. While some control schemes account for constraints of this nature, such as a bang-bang control, a general assumption in designing controllers is that the control is unrestricted or only has some maximum limit. The embodiments may assume that the fixed maximum thrust $T_{max}$ 271 is fixed but that the duration of each thruster firing can be adjusted to modulate the total amount of velocity change imparted to the spacecraft.

For each thruster of the spacecraft 101, there may be some minimum thrust duration $dt_{min}$ 273 that the thruster is able to provide thrust for. Additionally, the thruster duration 275 can be any integer multiple of the minimum thrust duration $dt_{min}$ 273, up to a maximum burn duration. Since the controller operates with a fixed update period $dt_{control}$ 279, there may be maximum duration of control $dt_{control}$ over each control step. Thus, the total change in velocity ΔV imparted by a single thruster over one control step is given by Eq. 9, where m is the mass of the spacecraft and $N_{thrust} \in \{0,1, \lfloor dt_{control}/dt_{min} \rfloor\}$ is the thruster duration in terms of minimum burn periods with $\lfloor \cdot \rfloor$ being the floor function.

$$\Delta V = \frac{T_{max}}{m} N_{thrust} dt_{min} \qquad (9)$$

Once the spacecraft 101 is predicted to go out of the bounding box 301, a fuel-optimal, fixed-time guidance trajectory 119 is generated. The guidance trajectory 119 is constrained to begin at the spacecraft's current state and to terminate on the desired trajectory while minimizing fuel usage.

The guidance trajectory 119 is planned over some time horizon of $N_g$ steps and seeks to minimize the objective function of Eq. 10, where $v_{nom,k}$ is the control input 285 at the kth step.

$$J_g = \sum_{k=0}^{N_g-1} \|v_{nom,k}\|_1 \qquad (10)$$

While there is no transient state error weightings, allowing the spacecraft 101 to drift along the drifting spacecraft trajectory 113 until the trajectory condiction 281 is satisfied, there are state constraints that keep the state within the keep-in boundary at each step. In the ROE space, a non-drifting orbit can be bounded by a time-invariant set of bounds for the guidance trajectories 119 of Eq. 11.

$$x_{min} \le x_{nom,k} \le x_{max}, k = 1, , N_g. \qquad (11)$$

This is equivalent to a 6-dimensional cube in ROE space but that is time-invariant and constrains the full orbit. Similarly, the control inputs 285 can be bounded as shown in Eq. 12.

$$v_{min} \le v_{nom,k} \le v_{max}, k = 0, , N_g - 1. \qquad (12)$$

The model dynamics for the discretized ROE may be formulated with intervals of duration dt. Given some initial state of the guidance trajectory $x_i$ 119, and a control input v 285, the state at the next step $x_{i+1}$ of the guidance trajectory 119 is found by combining the drifting and controlled dynamics. The instantaneous change due to the control input 285 is given by Eq. 13.

$$x_i^+ = x_i + Bv. \qquad (13)$$

The drifting spacecraft trajectory 113 is discretized using the state transition matrix of Eq. 14, where e is the matrix exponential.

$$A_D = e^{Adt} \quad (14)$$

This gives the full, controlled dynamics for the guidance trajectory 119 as Eq. 15.

$$x_{i+1} = A_D x_i + A_D B v_i. \quad (15)$$

While the ROE model assumes inputs as impulsive velocity change $\Delta V$ maneuvers, the spacecraft dynamics assume acceleration inputs. Assuming a zero-order hold for the acceleration model, a velocity change $\Delta V$ control input v 285 can be approximated as Eq. 16.

$$a = \frac{v}{dt}. \quad (16)$$

This allows for all the planning and optimization to be done assuming instantaneous velocity change $\Delta V$ control inputs 285 and then applied as accelerations to the actual spacecraft dynamics as a guidance trajectory 119.

If the guidance trajectory 119 is defined to have $N_g$ steps, then the nominal guidance trajectory $x_{nom,k}$ 119 for $k=1, N_g$, and associated control inputs $v_{nom,k}$ 285, for $k=0, N_g-1$, can be calculated as shown in Eq. 17.

$$\begin{aligned}
\min_{x_{nom}, v_{nom}} \quad & \sum_{k=0}^{N_g-1} |v_{nom,k}|_1 \quad (17)\\
\text{s.t.} \quad & x_{nom,k+1} = A_D x_{nom,k} + A_D B_k v_{nom,k} \quad k = 0, 1, , N_g - 1\\
& x_{nom,N_g} = x_{d,N_g}\\
& x_{nom,k} \leq x_{max} \quad k = 1, 2, , N_g\\
& x_{nom,k} \geq x_{min} \quad k = 1, 2, , N_g\\
& v_{nom,k} \leq v_{max} \quad k = 0, 1, 2, , N_g - 1\\
& v_{nom,k} \geq v_{min} \quad k = 0, 1, 2, , N_g - 1
\end{aligned}$$

The guidance trajectory 219 does not assume that the thrust must be constrained to integer multiples of the minimum impulse bit. This allows for the guidance trajectory 219 to be computed faster than if integer constraints were applied to the optimization. However, the nominal control inputs 285 generated by the guidance law are approximated as a fixed-thrust constraint before it is applied to the spacecraft 101. The minimum duration period number 297 for a thruster's maneuver controls 283 can be approximated by Eq. 18, where $\lfloor \cdot \rfloor$ is the floor function and acts elementwise.

$$m_{nom,k} = \left\lfloor \left( \frac{m v_{nom,k}}{dt_{min} T_{max}} \right) \right\rfloor, k = 0, , N_{guide} - 1 \quad (18)$$

The quantized $\Delta V$ trajectory velocities $v_{nom,k}$ 299 for the guidance trajectory 119 are then given by Eq. 19.

$$\bar{v}_{nom,k} = m_{nom,k} \left( \frac{dt_{min} T_{max}}{m} \right), k = 0, , N_{guide-1} \quad (19)$$

This introduces a small amount of error into the guidance trajectory 119 since the guidance law is not constrained to select control inputs 285 that satisfy the thrust duration constraints. However, with a closed-loop control the spacecraft 101 can reject these errors just as it would any other perturbing influence.

MPC is implemented to close the loop and reject perturbations acting on the spacecraft 101. At each simulation step, the MPC is initiated with the current spacecraft state and attempts to follow the guidance trajectory 119 while satisfying the state and control constraints. In one embodiment, while the MPC is recalculated at each step, the guidance trajectory 119 may be only calculated at the beginning of each maneuver with the MPC following the guidance trajectory 119 that corresponds to the current time. For notational convenience, when used with MPC, the subscripts on the guidance trajectory $x_{nom,k}$ 119 and maneuver controls $m_{guide,k}$ 283 are offset corresponding to the current time. Thus, a guidance trajectory $x_{nom,0}$ 119 refers to the guidance trajectory state at the time the MPC is running, not necessarily the initial state of the overall maintenance trajectory 119.

For the MPC controls, a minimum possible velocity change $\Delta V$ 295 is calculate that can be imparted to the spacecraft 101 given the minimum thrust duration 273. This can be found using Eq. 20 where dt is the minimum thrust duration 273, $T_{max}$ is the fixed maximum thrust 271, and m is the spacecraft mass.

$$\Delta V_{nom} = \frac{dt_{min} T_{max}}{m}. \quad (20)$$

In one embodiment, if every allowable maneuver control 283 is an integer multiple of the minimum velocity change $\Delta V$ 295, the MPC calculated at the kth step along its horizon can be expressed by Eq. 21 with $m_{c,k} \in Z^3$ indicating the number of minimum duration periods that the maneuver control 283 should be on along each axis with a negative element of $m_{c,k}$ indicating that the maneuver control 283 is acting along the negative axis.

$$v_{c,k} = m_{c,k} \Delta V_{nom} \quad (21)$$

The MPC can now optimize over the set of allowable integers which correspond to the allowable thruster durations. Considering the maximum allowable maneuver controls $m_{c,k}$ 283, an upper bound is determined by the discretization time of the controller. Given a step size of the minimum thrust duration dt 273, the upper bound on the maximum number of thrust durations is $m_{max}=\lceil dt/dt_{min} \rceil$ which corresponds to a thruster being active over the full step. This could be further constrained, if desired, to accommodate restrictions such as how long a thruster can continuously operate for. Additionally, the max duration constraint applies to the combined control obtained by summing the maneuver control 283 and MPC portions. Thus, the upper and lower control bounds at each step along the MPC horizon must be modified as shown in Eq. 22, where $1_{3\times1}$ is a 3×1 vector of ones.

$$m_{max,k} = m_{max}1_{3\times1} - m_{nom,k} \quad (22)$$

$$m_{min,k} = -m_{max}1_{3\times1} - m_{nom,k}$$

Since the maneuver controls 283 are discretized, there is the possibility of chattering occurring as the MPC attempts to match the guidance trajectory 119 but lacks the scalability to exactly reach it. In an effort to minimize this problem, a control deadband is implemented where the MPC cannot select a non-zero maneuver control 283 that is below the deadband $m_{db}$. This means that the MPC will not continually attempt to correct small errors and unnecessarily drive up the fuel usage. Note that the deadband only applies to maneuver control corrections the MPC calculates, not the open-loop control profile calculated by the guidance trajectory 119. Thus, if the guidance law plans guidance trajectories 119 with maneuver control magnitudes below the deadband the guidance trajectories 119 will still be performed but any corrections to this, calculated by the MPC, must be above the deadband threshold.

Combining the maximum duration constraint with the deadband gives the sets of allowable maneuver controls 283 using Eq. 23 with the total control being constrained as Eq. 24.

$$\begin{aligned} M_{+,k} &= \{m \in \mathbb{Z}^3 | m_{db}1_{3\times1} \le m \le m_{max,k}\} \\ M_{-,k} &= \{m \in \mathbb{Z}^3 | -m_{db}1_{3\times1} \ge m \ge m_{min,k}\} \\ M_0 &= \{0\} \end{aligned} \quad (23)$$

$$m_{c,k} \in M_{-,k} \cup M_0 \cup M_{-,k} \quad (24)$$

In one embodiment, each element of the maneuver controls $m_{c,k}$ 283 is considered individually. For example, if the maneuver control $m_{max,k}$ 283 is too large, relative to the deadband, along one axis, the embodiments may set $M_{+,k}$ or $M_{-,k}$ may be empty along that axis but non-empty along the other axes.

The full MPC formulation can now be written as shown in Eq. 25 where R is the control usage weight 287, Q is the transient state error 289, and P is the final state error 291.

$$\min_{x_c, m_c} \sum_{k=0}^{N_c-1} |Rm_{c,k}|_1 + \sum_{k=1}^{N_c-1} |Qx_{e,k}|_1 + |Px_{e,N}|_1 \quad (25)$$

$$\begin{aligned} \text{s.t.} \quad x_{c,k+1} &= A_D x_{c,k} + A_D B_k m_{c,k} \Delta V_{nom} + & k &= 0, 1, , N_c - 1 \\ & \quad A_D B_k m_{guide,k} \Delta V_{nom} & k &= 1, 2, , N_c \\ x_{e,k} &= x_{nom,k} - x_{c,k} & k &= 1, 2, , N_c \\ x_{c,k} &\le x_{max} & k &= 1, 2, , N_c \\ x_{c,k} &\ge x_{min} & k &= 1, 2, , N_c \\ m_{c,k} &\in M_{-,k} \cup M_0 \cup M_{+,k} & k &= 0, 1, 2, , N_c - 1 \end{aligned}$$

Once the correction maneuver controls $m_c$ 283 are calculated, the total maneuver control m 283 is calculated as Eq. 26.

$$m_k = m_{c,k} + m_{g,k} k = 0, , N_c - 1 \quad (26)$$

The maneuver control $m_k$ 283 is applied to the spacecraft 101.

In one embodiment, the impact of the deadband is dependent on the choice of weights R, Q, and P since it effectively sets a minimum weight that must be offset by improvements in the error states. While something similar could be achieved by simply increasing the R weight, the use of the deadband eliminates small control applications but does not affect the weightings of anything outside the deadband range.

Figure 3A:
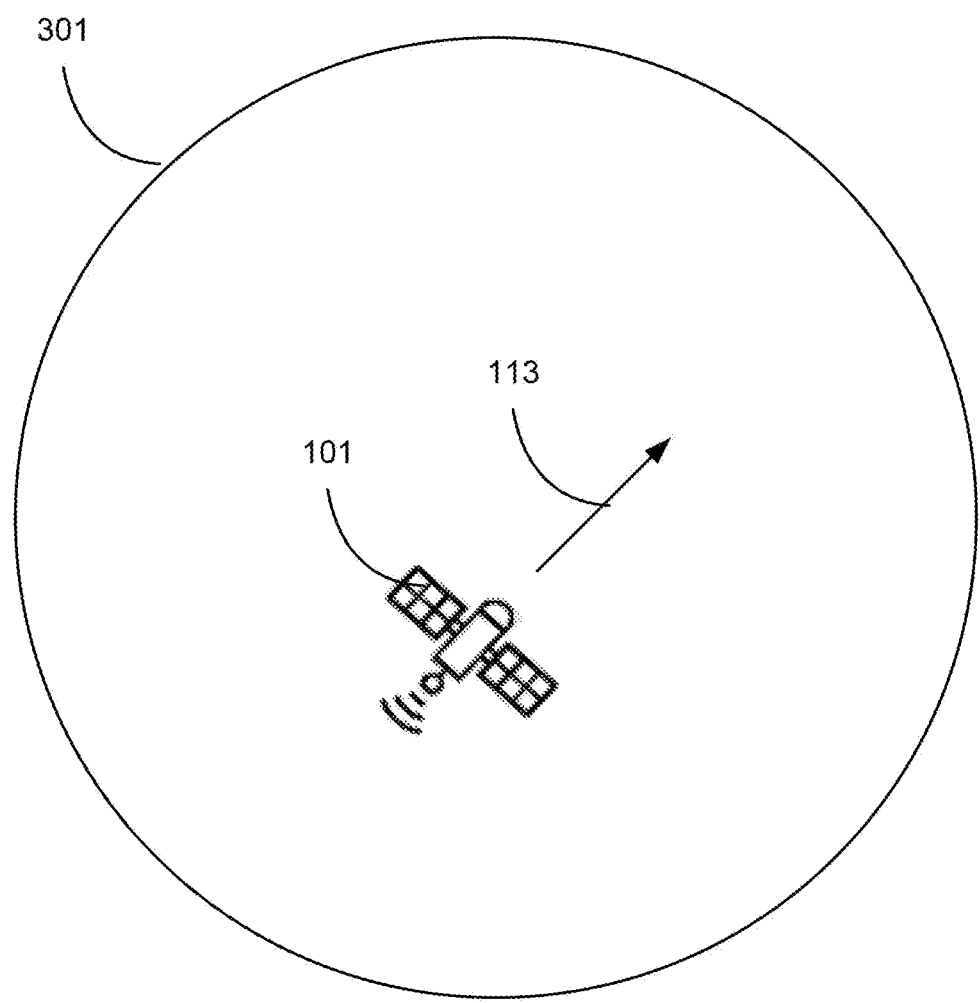
FIG. 3A is a drawing illustrating one embodiment of a bounding box.

FIG. 3A is a drawing illustrating one embodiment of a bounding box 301. In the depicted embodiment, the bounding box 301 is spherical. The trajectory condition is satisfied if the drifting spacecraft trajectory 113 is predicted to carry the spacecraft 101 outside of the bounding box 301.

Figure 3B:
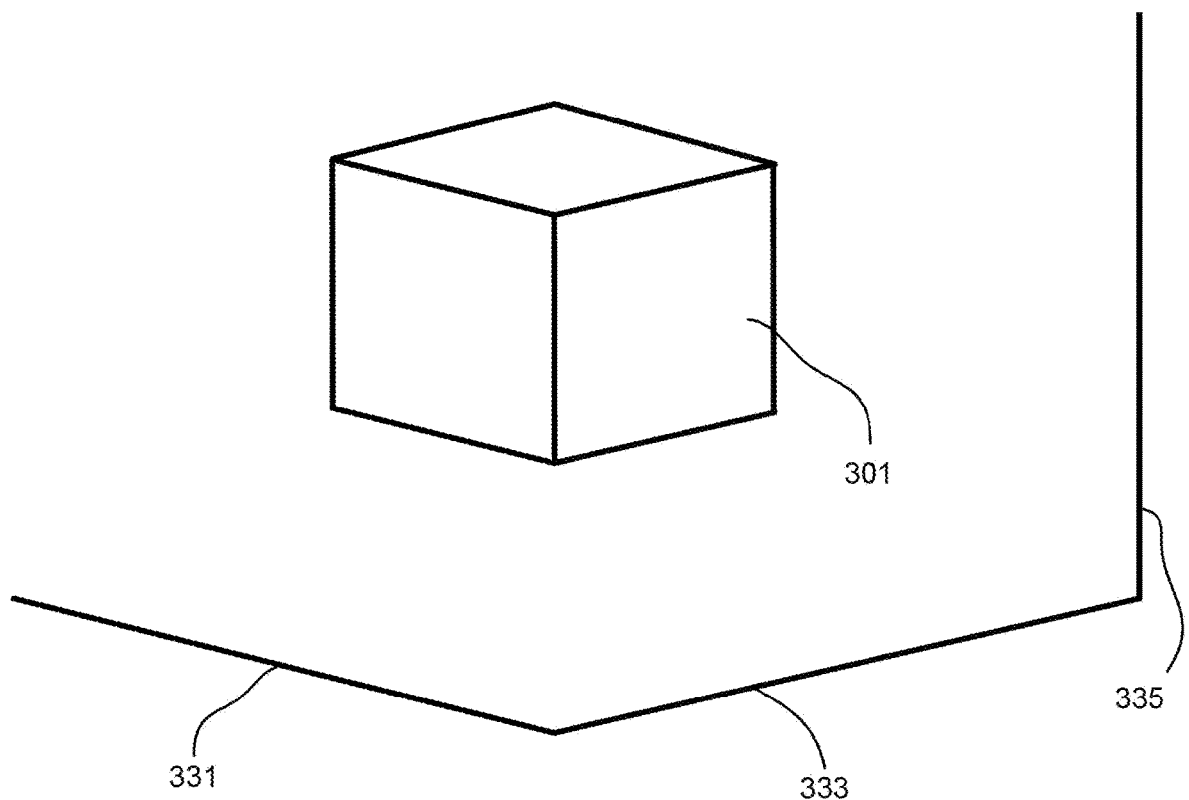
FIG. 3B is a drawing illustrating one embodiment of a bounding box.

FIG. 3B is a drawing illustrating one embodiment of a bounding box 301. The bounding box 301 may be an ROE-based polytope. The bounding box 301 is shown as a rectangle along the radial axis 331, along orbital track axis 333, and along the cross-orbital track axis 335. The bounding box 301 may change in shape over time. In the depicted embodiment, the bounding box 301 is six-sided with each side being a trajectory condition 281.

Figure 4:
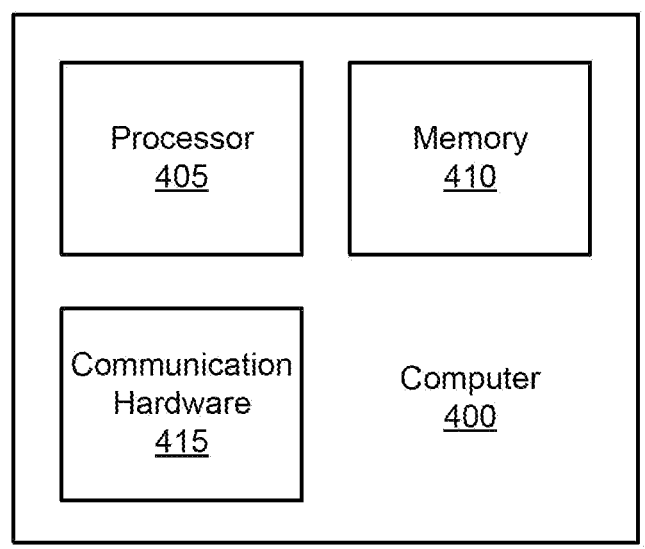
FIG. 4 is a schematic block diagram illustrating one embodiment of a computer.

FIG. 4 is a schematic block diagram illustrating one embodiment of a computer 400. The computer 400 may be embodied in a spacecraft 101 and/or ground station 103. In the depicted embodiment, the computer 400 includes a processor 405, a memory 410, and communication hardware 415. The memory 410 may store code and data. The processor 405 may execute the code and process the data. The communication hardware 415 may communicate with other devices such as spacecraft 101 and ground stations 103.

Figure 5:
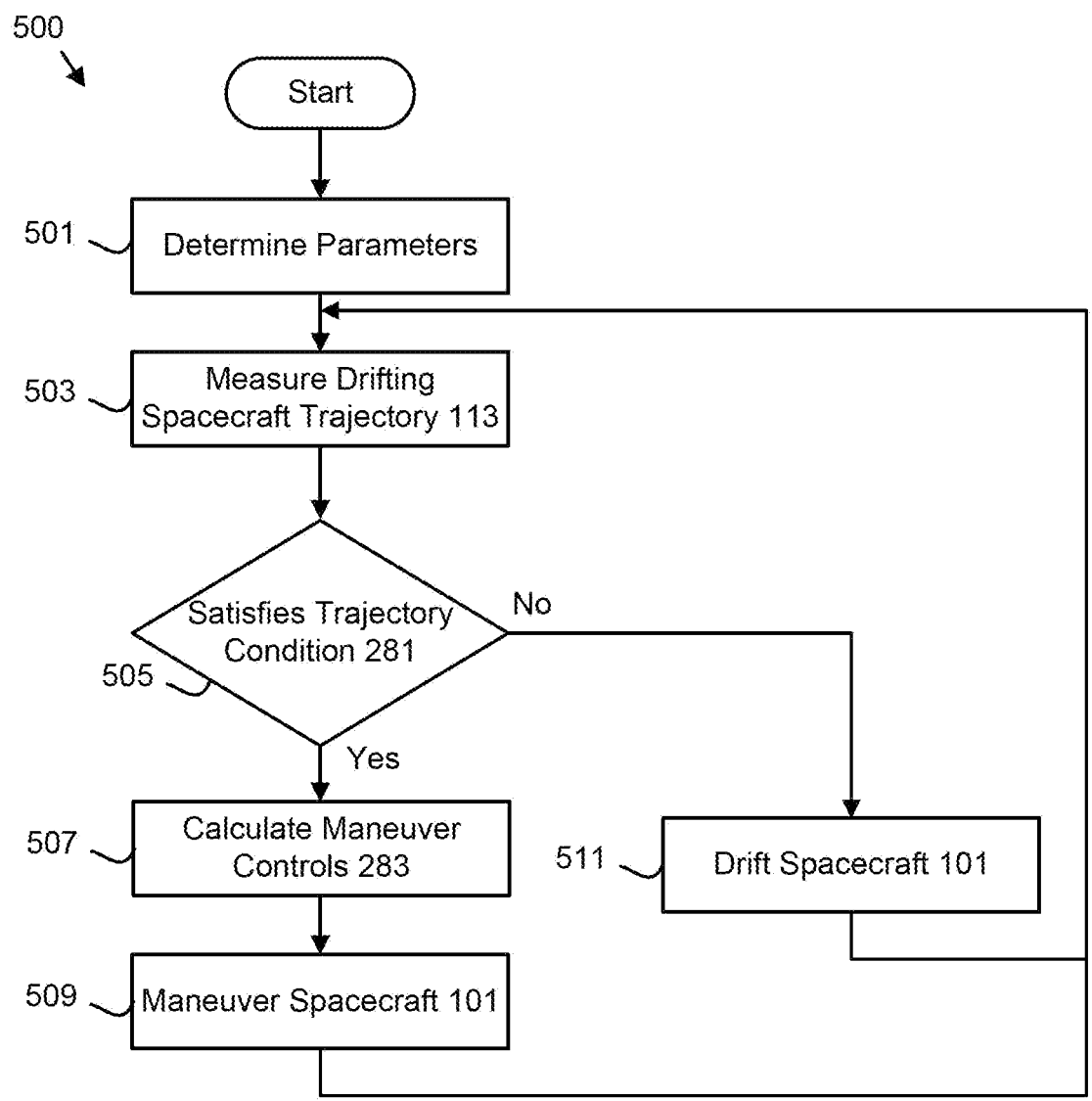
FIG. 5 is a schematic flow chart diagram illustrating one embodiment of a maneuver method.

FIG. 5 is a schematic flow chart diagram illustrating one embodiment of a maneuver method 500. The method 500 may maintain the spacecraft 101 within the bounding box 301. The method 500 may be performed by the spacecraft 101, a computer 400 of the spacecraft 101, and/or a remote computer 400 such as at a ground station 103. The method 500 may be performed by a processor 405 of a computer 400.

The method 500 starts, and in one embodiment, the method 500 determines 501 parameters for maneuvering the spacecraft 101. The parameters may include the formation data 200, the orbital data 221, and/or the maneuvering data 222. The parameters may be determined 501 from measured values, stored values, default values, and the like.

The method 500 measures 503 the drifting spacecraft trajectory $A_D$ 113 of the spacecraft 101 relative to the bounding box 301. In one embodiment, the spacecraft 101 has a fixed maximum thrust $T_{max}$ 271, a minimum thrust duration $dt_{min}$ 273, a thrust duration 275 that is an integer $N_{thrust}$ multiple of the minimum thrust duration 273, and a fixed update period $dt_{control}$ 279.

The method 500 determines 505 whether the drifting spacecraft trajectory 113 satisfies the trajectory condition 281. If the drifting spacecraft trajectory 113 does not satisfy the trajectory condition 281, the method 500 drifts 511 the spacecraft 101. If the drifting spacecraft trajectory 113 satisfies trajectory condition 281, the method 500 calculates 507 maneuver controls 283. The method 500 may calculate 507 at least one maneuver control 283. The maneuver controls 283 may be calculated 507 as described herein. The maneuver controls 283 may be iteratively calculated 507. In one embodiment, there are $N_g$ guidance trajectories 119 within the thruster duration 275.

The method 500 further maneuvers 509 the spacecraft 101 along the guidance trajectory 119 with the maneuver controls 283. The spacecraft 101 may maneuver 509 along at least one guidance trajectory 119. As a result, the method 500 maintains the spacecraft 101 within the bounding box 301. By maintaining the spacecraft 101 within the bounding box 301, the efficiency and efficiency of controlling the spacecraft formation 109 is improved.

Figure 6A:
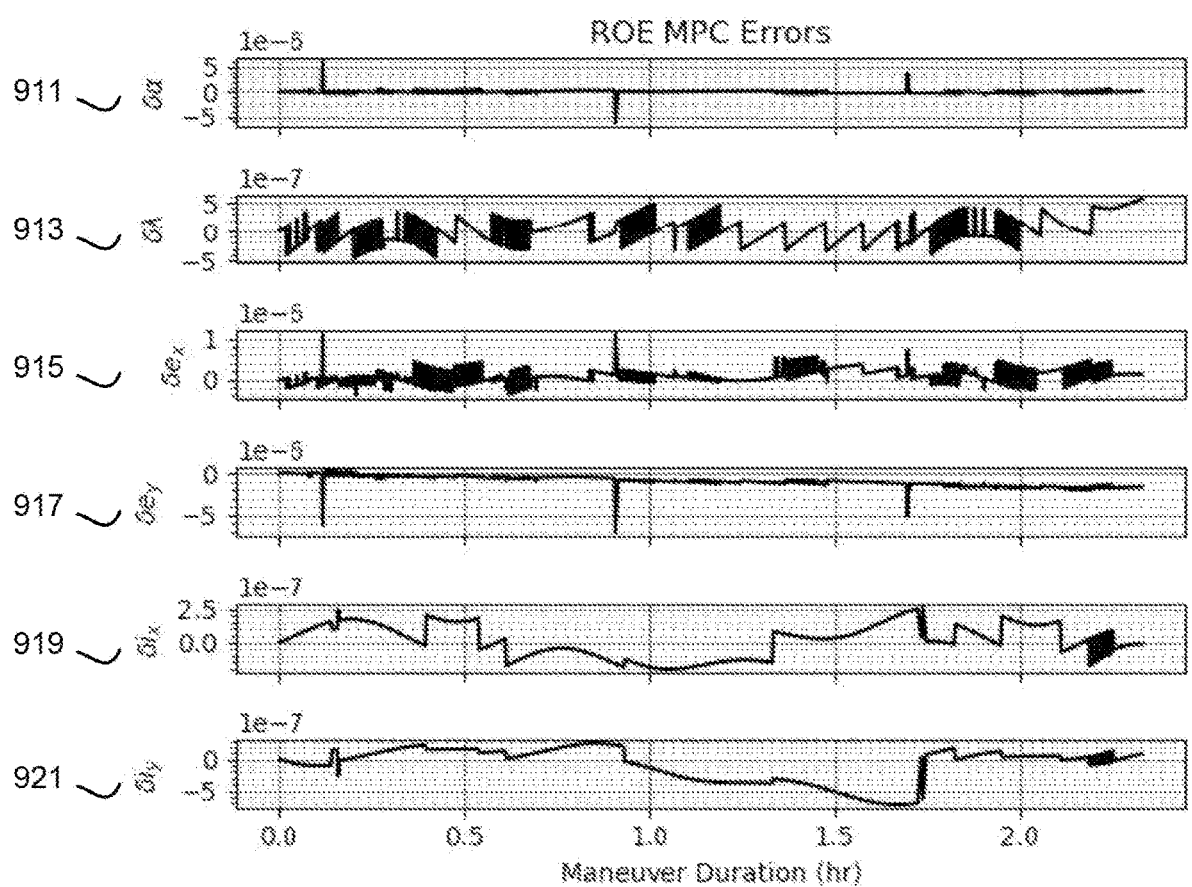
FIG. 6A is a graph illustrating one embodiment of maneuver errors.

FIG. 6A is a graph illustrating one embodiment of maneuver errors for a simulated maneuver. The relative difference in semi-major axis $\delta\alpha$ 911, the relative mean longitude $\delta\lambda$ 913 between two spacecraft 101 and/or a spacecraft 101 and a virtual point 111, the x axis eccentricity $e_x$ 915, the y axis eccentricity $e_y$ 917, the change in x inclination $\delta i_x$ 919 and the change in y inclination $\delta i_y$ 921 are shown over a maneuver duration.

Figure 6B:
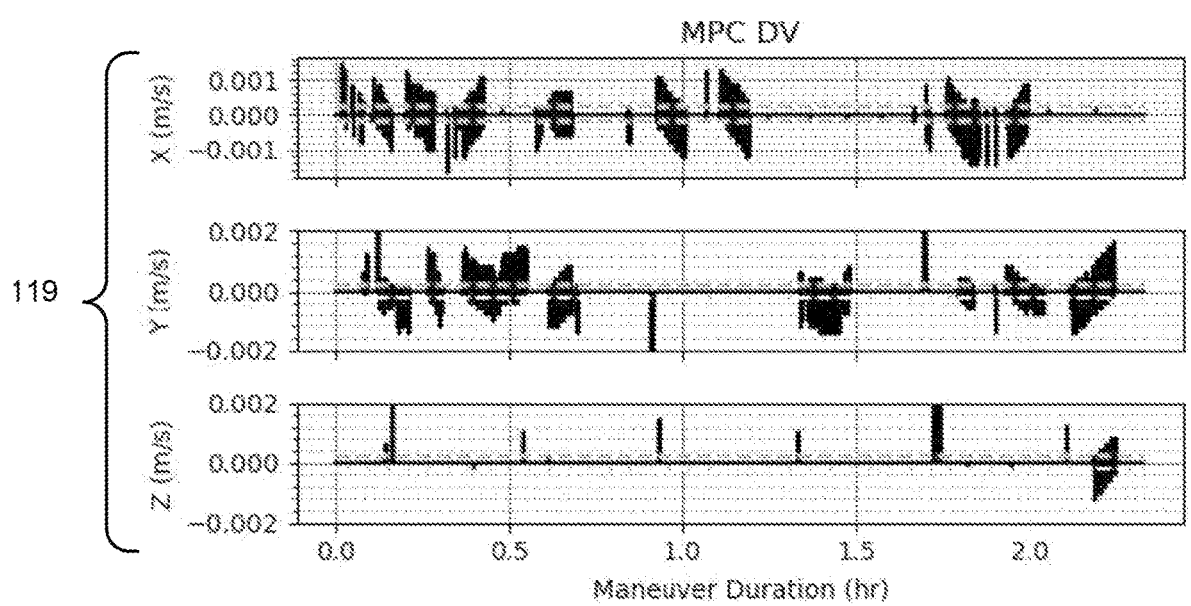
FIG. 6B is a graph illustrating one embodiment of maneuver.

FIG. 6B is a graph illustrating one embodiment of maneuvers. The guidance trajectories 119 comprising X, Y, and Z vectors for the maneuvers of FIG. 6A are shown.

Figure 7A:
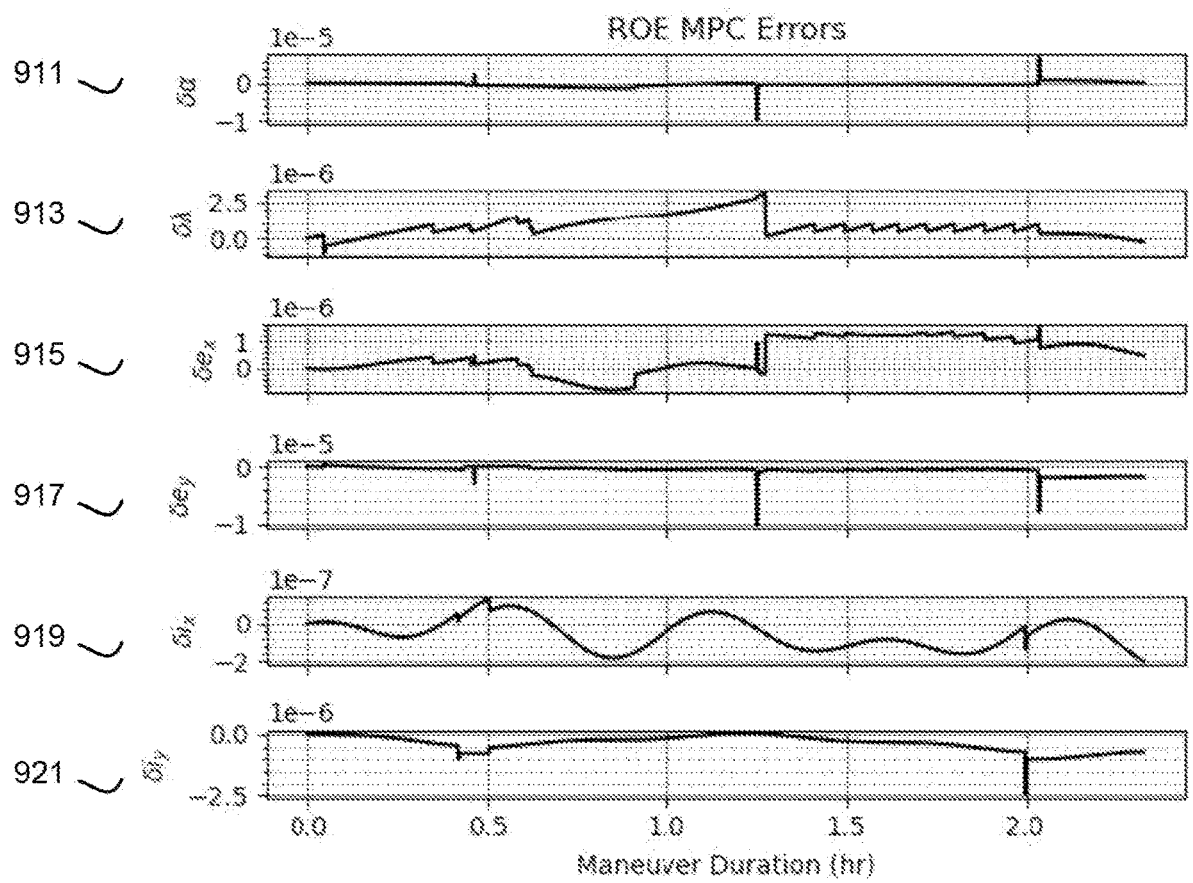
FIG. 7A is a graph illustrating one embodiment of maneuver errors.

FIG. 7A is a graph illustrating one embodiment of maneuver errors for an alternate simulated maneuver. The relative difference in semi-major axis $\delta\alpha$ 911, the relative mean longitude $\delta\lambda$ 913 between two spacecraft 101 and/or a spacecraft 101 and a virtual point 111, the x axis eccentricity $e_x$ 915, the y axis eccentricity $e_y$ 917, the change in x inclination $\delta i_x$ 919 and the change in y inclination $\delta i_y$ 921 are shown over a maneuver duration of the alternate maneuver.

Figure 7B:
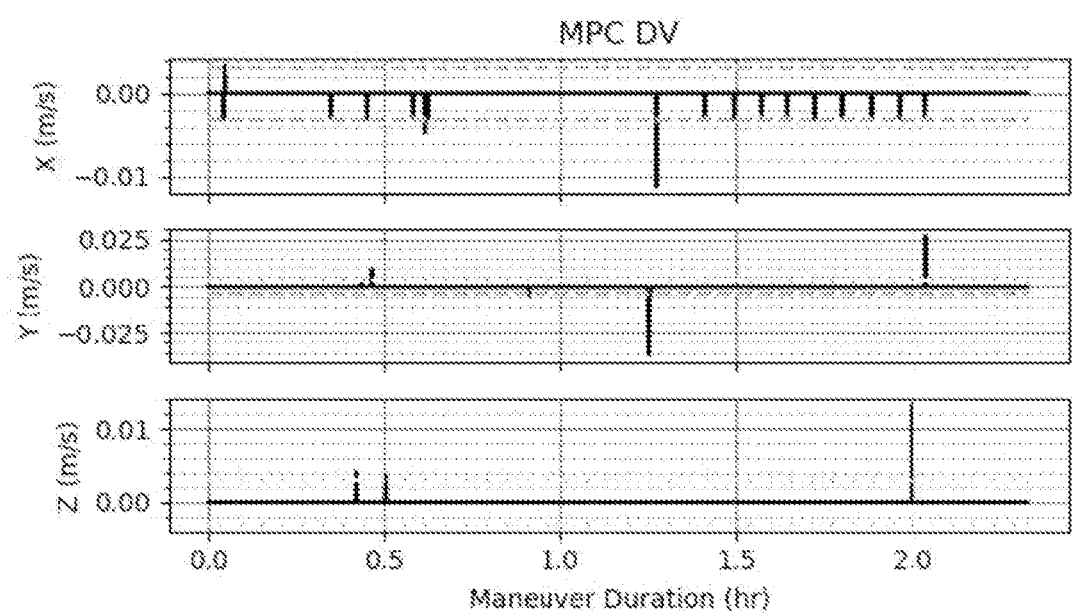
FIG. 7B is a graph illustrating one embodiment of maneuver.

FIG. 7B is a graph illustrating one embodiment of maneuvers. The guidance trajectories 119 comprising X, Y, and Z vectors for the maneuvers of FIG. 7A are shown.

Figure 8:
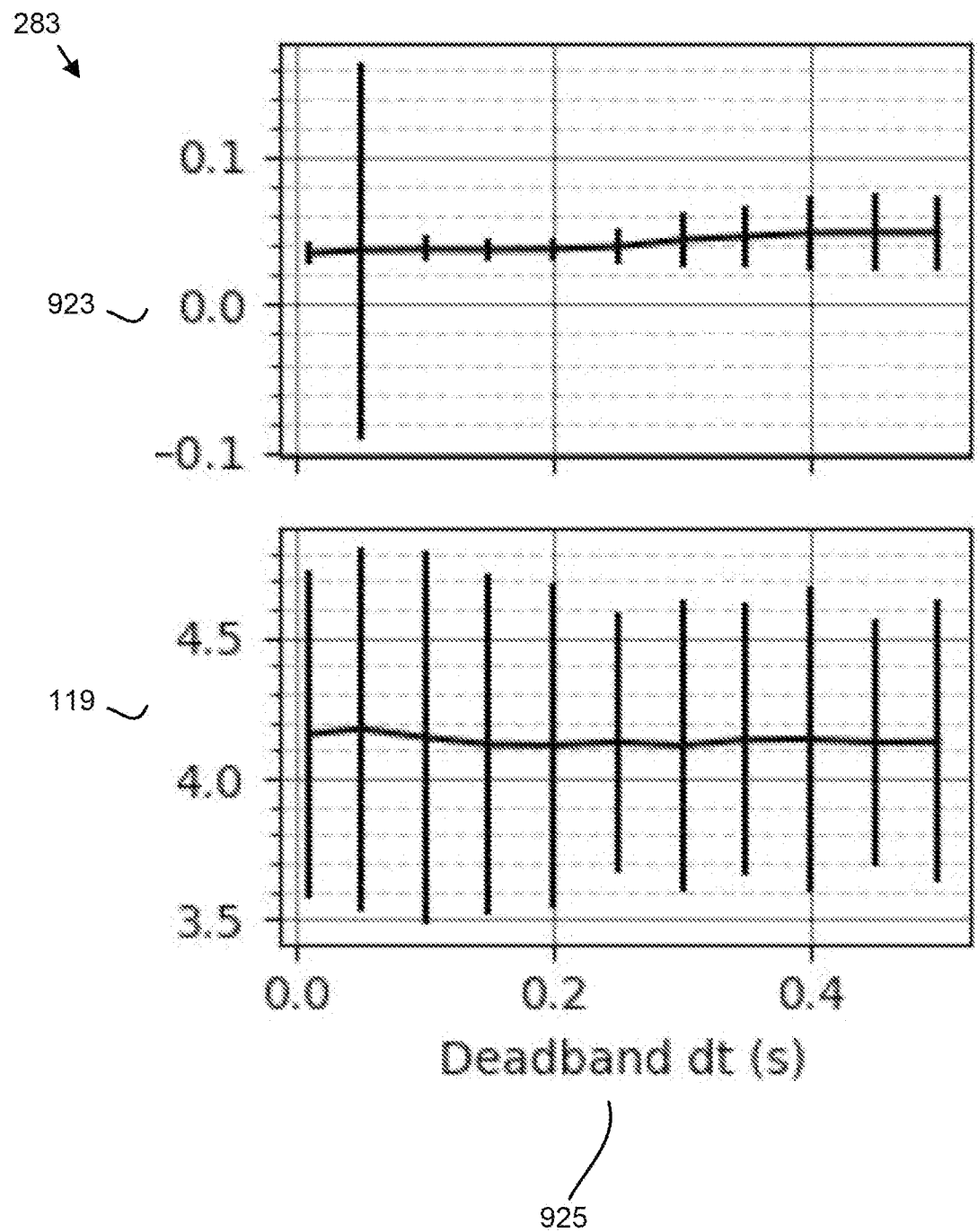
FIG. 8 is a graph illustrating one embodiment of computation time.

FIG. 8 is a graph illustrating one embodiment of computation time 923 for simulated maneuver controls 283 and guidance trajectories 119 for deadband periods dt 925.

Figure 9A:
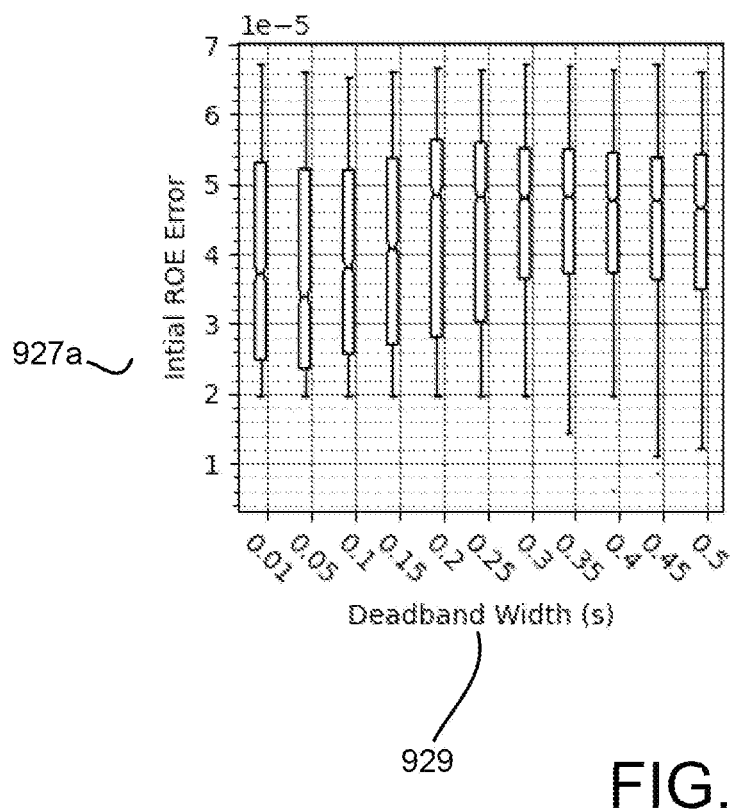
FIG. 9A is a graph illustrating one embodiment of initial Relative Orbital State (ROE) error for deadband width.
Figure 9B:
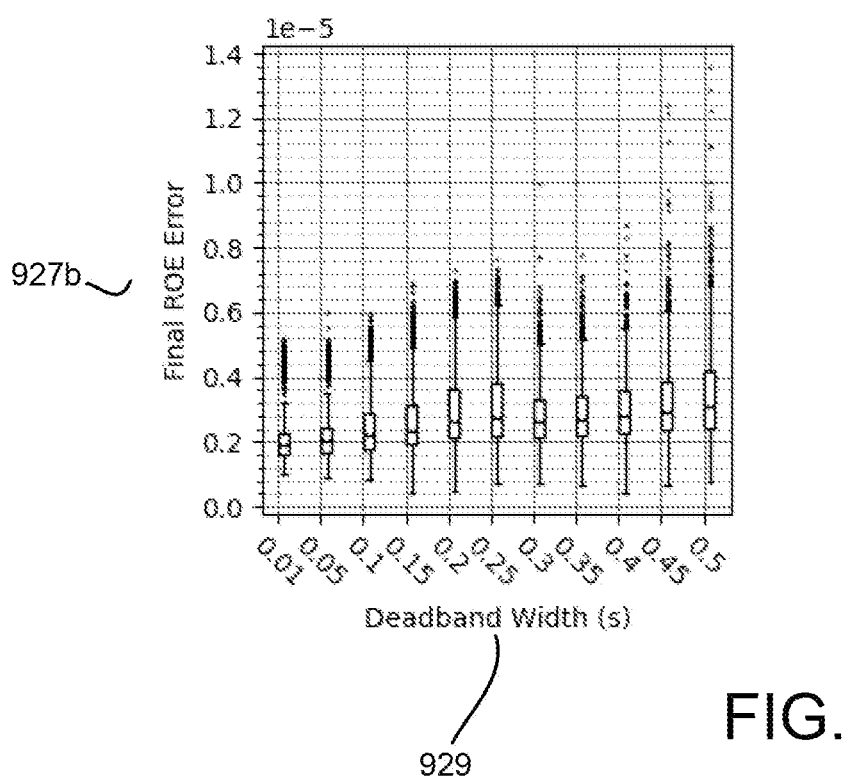
FIG. 9B is a graph illustrating one embodiment of final ROE error for deadband width.

FIG. 9A is a graph illustrating one embodiment of initial ROE error 927a for a simulated maneuver deadband width 929. FIG. 9B is a graph illustrating one embodiment of final ROE error 927b for the simulated maneuver deadband width 929.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
   iteratively measuring a drifting spacecraft trajectory of a spacecraft relative to a bounding box, wherein the spacecraft has a fixed maximum thrust $T_{max}$, a minimum thrust duration $dt_{min}$, a thrust duration that is an integer $N_{thrust}$ multiple of the minimum thrust duration, and a fixed update period $dt_{control}$;
   in response to the determining the spacecraft does not satisfy a trajectory condition, iteratively calculating at least one maneuver control wherein there are $N_g$ guidance trajectories within the thruster duration, wherein the guidance trajectories are Model Predictive Control (MPC) calculated from a drifting spacecraft trajectory, constrained maneuver controls, guidance trajectories, a virtual point, a current state, a control usage weight, a transient state error weight, and a final state error weight; and
   maneuvering the spacecraft along the guidance trajectories with the at least one maneuver control.

2. The method of claim 1, wherein the MPC are calculated as $$\min_{x_c, m_c} \sum_{k=0}^{N_c-1} |Rm_{c,k}|_1 + \sum_{k=1}^{N_c-1} |Qx_{e,k}|_1 + |Px_{e,N}|_1$$

s.t. 
$x_{c,k+1} = A_D x_{c,k} + A_D B_k m_{c,k} \Delta V_{nom} + A_D B_k m_{guide,k} \Delta V_{nom}$    $k = 0, 1, , N_c - 1$ $x_{e,k} = x_{nom,k} - x_{c,k}$    $k = 1, 2, , N_c$ $x_{c,k} \leq x_{max}$    $k = 1, 2, , N_c$ $x_{c,k} \geq x_{min}$    $k = 1, 2, , N_c$ $m_{c,k} \in M_{-,k} \cup M_0 \cup M_{+,k}$    $k = 0, 1, 2, , N_c - 1$ wherein B is a control matrix, $A_D$ is the drifting spacecraft trajectory, $m_{c,k}$ are the constrained maneuver controls, x are the guidance trajectories, c indicates the virtual point, d indicates the spacecraft, norm indicates the current state, R is the control usage weight, Q is the transient state error weight, and P is the final state error weight.

3. The method of claim 2, wherein the maneuver controls $m_{c,k}$ are constrained by $M_{+,k} = \{m \in \mathbb{Z}^3 | m_{db} 1_{3 \times 1} \leq m \leq m_{max,k}\}$ $M_{+,k} = \{m \in \mathbb{Z}^3 | -m_{db} 1_{3 \times 1} \geq m \geq m_{min,k}\}$ $M_0 = \{0\}$ where $m_{c,k} \in M_{-,k} \cup M_0 \cup M_{-,k}$ and $1_{3 \times 1}$ is a matrix of ones.

4. The method of claim 3, wherein at least one fixed-time guidance trajectory $x_{nom,k}$ 119 minimizes the objective function $J_g$ with fixed-time guidance trajectories 119 subject to:

$$\min_{x_{nom}, v_{nom}} J_g = \sum_{k=0}^{N_g-1} |v_{nom,k}|_1$$

s.t. 
$x_{nom,k+1} = A_D x_{nom,k} + A_D B_k v_{nom,k}$    $k = 0, 1, , N_g - 1$ $x_{nom,N_g} = x_{d,N_g}$ $x_{nom,k} \leq x_{max}$    $k = 1, 2, , N_g$ $x_{nom,k} \geq x_{min}$    $k = 1, 2, , N_g$ $v_{nom,k} \leq v_{max}$    $k = 0, 1, 2, , N_g - 1$ $v_{nom,k} \geq v_{min}$    $k = 0, 1, 2, , N_c - 1$ wherein $v_{norm,k}$ is a control input at a kth step.

5. The method of claim 4, wherein a minimum duration period number $m_{nom,k}$ is calculated as $$m_{nom,k} = \left\lfloor \left( \frac{m v_{nom,k}}{dt_{min} T_{max}} \right) \right\rfloor, k = 0, , N_{guide} - 1$$

and trajectories velocities are calculated as $$\bar{v}_{nom,k} = m_{nom,k}\left(\frac{dt_{min}T_{max}}{m}\right), k = 0, , N_{guide-1}.$$

6. The method of claim 1, the method further calculating the virtual point that represents a plurality of spacecraft orbiting in a spacecraft formation.

7. The method of claim 1, wherein the drifting spacecraft trajectory is a Relative Orbital State (ROE).

8. The method of claim 1, wherein the trajectory condition is the drifting spacecraft trajectory relative to the bounding box that is less than a minimum trajectory error.

9. An apparatus comprising:
a processor executing code stored on a memory to perform:
iteratively measuring a drifting spacecraft trajectory of a spacecraft relative to a bounding box,
wherein the spacecraft has a fixed maximum thrust $T_{max}$, a minimum thrust duration $dt_{min}$, a thrust duration that is an integer $N_{thurst}$ multiple of the minimum thrust duration, and a fixed update period $dt_{control}$;
in response to the determining the spacecraft does not satisfy a trajectory condition, iteratively calculating at least one maneuver control wherein there are $N_g$ guidance trajectories within the thruster duration, wherein the guidance trajectories are Model Predictive Control (MPC) calculated from a drifting spacecraft trajectory, constrained maneuver controls, guidance trajectories, a virtual point, a current state, a control usage weight, a transient state error weight, and a final state error weight; and
maneuvering the spacecraft along the guidance trajectories with the at least one maneuver control.

10. The apparatus of claim 9, wherein the MPC are calculated as $$\min_{x_c, m_c} \sum_{k=0}^{N_c-1} |Rm_{c,k}|_1 + \sum_{k=1}^{N_c-1} |Qx_{e,k}|_1 + |Px_{e,N}|_1$$

s.t. $x_{c,k+1} = A_D x_{c,k} + A_D B_k m_{c,k} \Delta V_{nom} + A_D B_k m_{guide,k} \Delta V_{nom}$    $k = 0, 1, , N_c - 1$ $x_{e,k} = x_{nom,k} - x_{c,k}$    $k = 1, 2, , N_c$ $x_{c,k} \leq x_{max}$    $k = 1, 2, , N_c$ $x_{c,k} \geq x_{min}$    $k = 1, 2, , N_c$ $m_{c,k} \in M_{-,k} \cup M_0 \cup M_{+,k}$    $k = 0, 1, 2, , N_c - 1$ wherein B is a control matrix, $A_D$ is the drifting spacecraft trajectory, $m_{c,k}$ are the constrained maneuver controls, x are the guidance trajectories, c indicates the virtual point, d indicates the spacecraft, R is the control usage weight, Q is the transient state error weight, and P is the final state error weight.

11. The apparatus of claim 10, where the maneuver controls $m_{c,k}$ are constrained by $$M_{+,k} = \{m \in \mathbb{Z}^3 | m_{db} 1_{3\times 1} \leq m \leq m_{max,k}\}$$

$$M_{-,k} = \{m \in \mathbb{Z}^3 | -m_{db} 1_{3\times 1} \geq m \geq m_{min,k}\}$$

$$M_0 = \{0\}$$

where $m_{c,k} \in M_{-,k} \cup M_0 \cup M_{-,k}$ and $1_{3\times 1}$ is a matrix of ones.

12. The apparatus of claim 11, wherein at least one fixed-time guidance trajectory $x_{nom,k}$ 119 minimizes the objective function $J_g$ with fixed-time guidance trajectories 119 subject to:

$$\min_{x_{nom}, v_{nom}} J_g = \sum_{k=0}^{N_g-1} |v_{nom,k}|_1$$

s.t. $x_{nom,k+1} = A_D x_{nom,k} + A_D B_k v_{nom,k}$    $k = 0, 1, , N_g - 1$ $x_{nom,N_g} = x_{d,N_g}$ $x_{nom,k} \leq x_{max}$    $k = 1, 2, , N_g$ $x_{nom,k} \geq x_{min}$    $k = 1, 2, , N_g$ $v_{nom,k} \leq v_{max}$    $k = 0, 1, 2, , N_g - 1$ $v_{nom,k} \geq v_{min}$    $k = 0, 1, 2, , N_c - 1$ wherein $v_{norm,k}$ is a control input at a kth step.

13. The apparatus of claim 12, wherein a minimum duration period number $m_{nom,k}$ is calculated as $$m_{nom,k} = \left\lfloor\left(\frac{mv_{nom,k}}{dt_{min}T_{max}}\right)\right\rfloor, k = 0, , N_{guide} - 1$$

and trajectories velocities are calculated as $$\bar{v}_{nom,k} = m_{nom,k}\left(\frac{dt_{min}T_{max}}{m}\right), k = 0, , N_{guide-1}.$$

14. The apparatus of claim 9, the method further calculating the virtual point that represents a plurality of spacecraft orbiting in a spacecraft formation.

15. The apparatus of claim 9, wherein the drifting spacecraft trajectory is a Relative Orbital State (ROE).

16. The apparatus of claim 9, wherein the trajectory condition is the drifting spacecraft trajectory relative to the bounding box that is less than a minimum trajectory error.

17. A computer program product comprising a non-transitory storage medium storing code executable by a processor to perform:
- iteratively measuring a drifting spacecraft trajectory of a spacecraft relative to a bounding box, wherein the spacecraft has a fixed maximum thrust $T_{max}$, a minimum thrust duration $dt_{min}$, a thrust duration that is an integer $N_{thurst}$ multiple of the minimum thrust duration, and a fixed update period $dt_{control}$;
- in response to the determining the spacecraft does not satisfy a trajectory condition, iteratively calculating at least one maneuver control wherein there are $N_g$ guidance trajectories within the thruster duration, wherein the guidance trajectories are Model Predictive Control (MPC) calculated from a drifting spacecraft trajectory, constrained maneuver controls, guidance trajectories, a virtual point, a current state, a control usage weight, a transient state error weight, and a final state error weight; and
- maneuvering the spacecraft along the guidance trajectories with the at least one maneuver control.

18. The computer program product of claim 17, wherein the MPC are calculated as $$\min_{x_c, m_c} \sum_{k=0}^{N_c-1} |Rm_{c,k}|_1 + \sum_{k=1}^{N_c-1} |Qx_{e,k}|_1 + |Px_{e,N}|_1$$

s.t.
$$x_{c,k+1} = A_D x_{c,k} + A_D B_k m_{c,k} \Delta V_{nom} + A_D B_k m_{guide,k} \Delta V_{nom} \quad k = 0, 1, , N_c - 1$$

$$x_{e,k} = x_{nom,k} - x_{c,k} \quad k = 1, 2, , N_c$$

$$x_{c,k} \leq x_{max} \quad k = 1, 2, , N_c$$

$$x_{c,k} \geq x_{min} \quad k = 1, 2, , N_c$$

$$m_{c,k} \in M_{-,k} \cup M_0 \cup M_{+,k} \quad k = 0, 1, 2, , N_c - 1$$

wherein B is a control matrix, $A_D$ is the drifting spacecraft trajectory, $m_{c,k}$ are the constrained maneuver controls, x are the guidance trajectories, c indicates the virtual point, d indicates the spacecraft, R is the control usage weight, Q is the transient state error weight, and P is the final state error weight.

19. The computer program product of claim 18, where the maneuver controls $m_{c,k}$ are constrained by $$M_{+,k} = \{m \in \mathbb{Z}^3 | m_{db} 1_{3\times 1} \leq m \leq m_{max,k}\}$$

$$M_{-,k} = \{m \in \mathbb{Z}^3 | -m_{db} 1_{3\times 1} \geq m \geq m_{min,k}\}$$

$$M_0 = \{0\}$$

where $m_{c,k} \in M_{-,k} \cup M_0 \cup M_{-,k}$ and $1_{3\times 1}$ is a matrix of ones.

20. The computer program product of claim 19, wherein at least one fixed-time guidance trajectory $x_{nom,k}$ 119 minimizes the objective function $J_g$ with fixed-time guidance trajectories 119 subject to:

$$\min_{x_{nom}, v_{nom}} J_g = \sum_{k=0}^{N_g-1} |v_{nom,k}|_1$$

s.t.
$$x_{nom,k+1} = A_D x_{nom,k} + A_D B_k v_{nom,k} \quad k = 0, 1, , N_g - 1$$

$$x_{nom,N_g} = x_{d,N_g}$$

$$x_{nom,k} \leq x_{max} \quad k = 1, 2, , N_g$$

$$x_{nom,k} \geq x_{min} \quad k = 1, 2, , N_g$$

$$v_{nom,k} \leq v_{max} \quad k = 0, 1, 2, , N_g - 1$$

$$v_{nom,k} \geq v_{min} \quad k = 0, 1, 2, , N_c - 1$$

wherein $v_{norm,k}$ is a control input at a kth step.

* * * * *